C. C. PAGE.
WRAPPING MACHINE.
APPLICATION FILED AUG. 22, 1913.

1,116,618.

Patented Nov. 10, 1914.
5 SHEETS—SHEET 1.

Witnesses
Edwin L. Bradford
Wm E. Dype

Inventor
Clarence C. Page
By Ritter & Ritter
his Attorneys

C. C. PAGE.
WRAPPING MACHINE.
APPLICATION FILED AUG. 22, 1913.

1,116,618.

Patented Nov. 10, 1914.

C. C. PAGE.
WRAPPING MACHINE.
APPLICATION FILED AUG. 22, 1913.

1,116,618. Patented Nov. 10, 1914.
5 SHEETS—SHEET 4.

UNITED STATES PATENT OFFICE.

CLARENCE C. PAGE, OF GRANTS PASS, OREGON, ASSIGNOR, BY MESNE ASSIGNMENTS, TO AMERICAN WRAPPING MACHINE COMPANY, OF PORTLAND, OREGON, A CORPORATION OF OREGON.

WRAPPING-MACHINE.

1,116,618.  Specification of Letters Patent.   Patented Nov. 10, 1914.

Application filed August 22, 1913. Serial No. 786,088.

*To all whom it may concern:*

Be it known that I, CLARENCE C. PAGE, a citizen of the United States, residing at Grants Pass, in the county of Josephine and State of Oregon, have invented certain new and useful Improvements in Wrapping-Machines; and I do hereby declare the following to be a full, clear, and exact description of the invention, such as will enable others skilled in the art to which it appertains to make and use the same.

My invention relates to the construction of wrapping machines which are employed to cover articles of merchandise with an enveloping wrapper of paper or the like flexible material, the particular form of apparatus shown in the drawings being primarily designed to be especially suitable for wrapping articles which are apt to vary somewhat in size and regularity of form, such, for example, as the small pieces of candy which are commonly known as kisses.

The object of the invention is to provide a simple and durable apparatus by means of which enveloping wrappers with twisted ends may be rapidly and efficiently formed around articles of merchandise that it is desired to wrap or cover. Generally stated, this object is effected by the coördinated action of means for continuously forming a strip, band or web of the wrapping material into a tube, means for feeding the article to be wrapped into the tube of wrapping material thus formed, means for twisting the wrapping material so as to cause it to be maintained in enveloping relation with the article of merchandise, and means for severing the strip of wrapping material into lengths corresponding to individual wrappers. In the preferred organization of these several means, as shown in the drawings, the wrapping material is continuously drawn from a roll thereof and, after passing around suitable tensioning mechanism, is formed into a tube by passing spirally downward around an open-ended tubular member through the interior of which the articles to be wrapped are regularly and intermittently fed. After the wrapping material is thus brought to tubular form it is twisted at intervals so as to securely surround each of the several articles introduced therein, each two twisted parts of the wrapper corresponding to a single article and the portion of the wrapping material between the articles being of sufficient length to prevent the wrappers from becoming accidentally untwisted after the connection of wrapping material between the articles has been severed. Upon leaving the wrapper twisting mechanism, which, as will hereinafter more fully appear, preferably include wrapper-engaging devices that are so mounted and actuated as to both rotate and travel bodily continuously, the wrapped articles are freed from each other through the instrumentality of a knife mechanism which is timed so as to sever the wrapping material midway between the adjacent twists that are formed between succeeding articles. The completely wrapped articles then pass out of the machine.

In the drawing illustrating my invention, the scope whereof is hereinafter pointed out in the claims.

Similar features of construction are indicated by corresponding reference characters throughout the drawings.

In order that the articles to be wrapped may be conveniently fed to the machine from work tables of different heights, it is preferred to so construct the frame of the apparatus that the operative mechanisms and the motor by which such mechanisms are driven may be adjusted vertically through a sufficient distance to cover the normal range of variation in height of work tables in different factories. To this end the frame of the machine is preferably constructed with a suitable base 1 having a plurality of vertically extending cylindrical standards 2 rigidly secured thereto. Slidably mounted on the standards 2 are corresponding, hollow cylindrical standards 3 to the lower ends of which is secured a suitable plate or casting 4 forming a support for an electric motor 5, such a motor being the preferred character of means employed for driving the wrapping mechanisms. Intermediate of their ends the standards 3 are provided with rigidly attached collars 6 upon which rests a member or casting 7 that supports the wrapper twisting and cutting mechanisms, as will hereinafter appear. Through the intervention of tubular spacers 8 which rest upon the member 7 and encircle the corresponding cylindrical standards 3, the member 7 also supports the upper frame or casting 9 that carries the plate 10 upon which are mounted the mechanism for feeding the articles and the preliminary wrapper forming mechanism, as well as the wrapper supply reel and the wrapper tensioning devices. Cap nuts 11 which have threaded engagement with the upper ends of the tubular standards 3 of the machine frame serve to hold the upper frame member or casting 9 firmly against the upper ends of the vertically extending spacers 8. When it is desired to raise or lower the operative parts of the machine it is only necessary to loosen the set-screw 12', which has threaded engagement with the motor supporting casting 4 and with one of the tubular standards 3 and which is adapted to also engage the corresponding upwardly extending inner standard 2, then adjust the telescoping standards 2 and 3 to the desired position, and, finally, tighten the set-screw. By thus mounting the motor and operative parts of the mechanism on a telescoping frame of the character described the connections between the motor and the mechanisms driven thereby require no change or adjustment when the height of the machine is altered to bring the feed chute to the level of any work-table.

The wrapper twisting devices and the knife mechanism by which the wrapping material is severed to free the wrapped articles from each other are arranged to rapidly and continuously spin bodily on a vertical axis while their parts simultaneously shift their relative positions in the performance of their respective functions. To this end the knife devices and wrapper twisting mechanism are preferably mounted upon a bed 12 having an annular lower flange 13 to the under side of which is secured a frictional facing 14 of such material, for example, as leather. When the machine is in operation this leather facing 14 rests upon the upper surface of the corresponding annular portion 15 of a rotating member 16 that is rigidly secured to an encircling annular pulley 17 which is driven from the motor 5 by a belt 18, the rotation of the member 16 being thus frictionally communicated to the bed 12 upon which the wrapper twisting and knife mechanisms are mounted. The rotating member 16, whose central aperture may, if desired, be surrounded by a downwardly extending directing tube or flange 19 which prevents the wrapped articles delivered therethrough from being scattered by the centrifugal force due to the rotation of the mechanism, is preferably provided near its upper end with a circular ball race 20 corresponding to the similar ball race 21 formed in the casting 7 that is supported by the standards of the machine frame. Balls 22 which are located between these raceways serve to support and center the rotating member 16 so that it may revolve on a vertical axis, and as the bed 12 upon which the wrapper twisting and knife mechanisms are mounted fits into and is centered by the cylindrical cup formed and bounded by the upwardly extending annular ball-race 20 of the member 16, such bed 12 revolves on the same vertical axis as the rotating member 16 by which it is frictionally driven.

The round belt 18 by which the grooved pulley 17 is preferably driven from the pulley 23 of the motor 5 may conveniently have its direction changed from the vertical to the horizontal by passing over idler pulleys 24 and 25 which are horizontally journaled on a bracket 26 that is secured to adjacent tubular standards 3 of the machine frame.

Figures 1, 18, 19, 20, 21, 22, 23, 31, 32, 33:
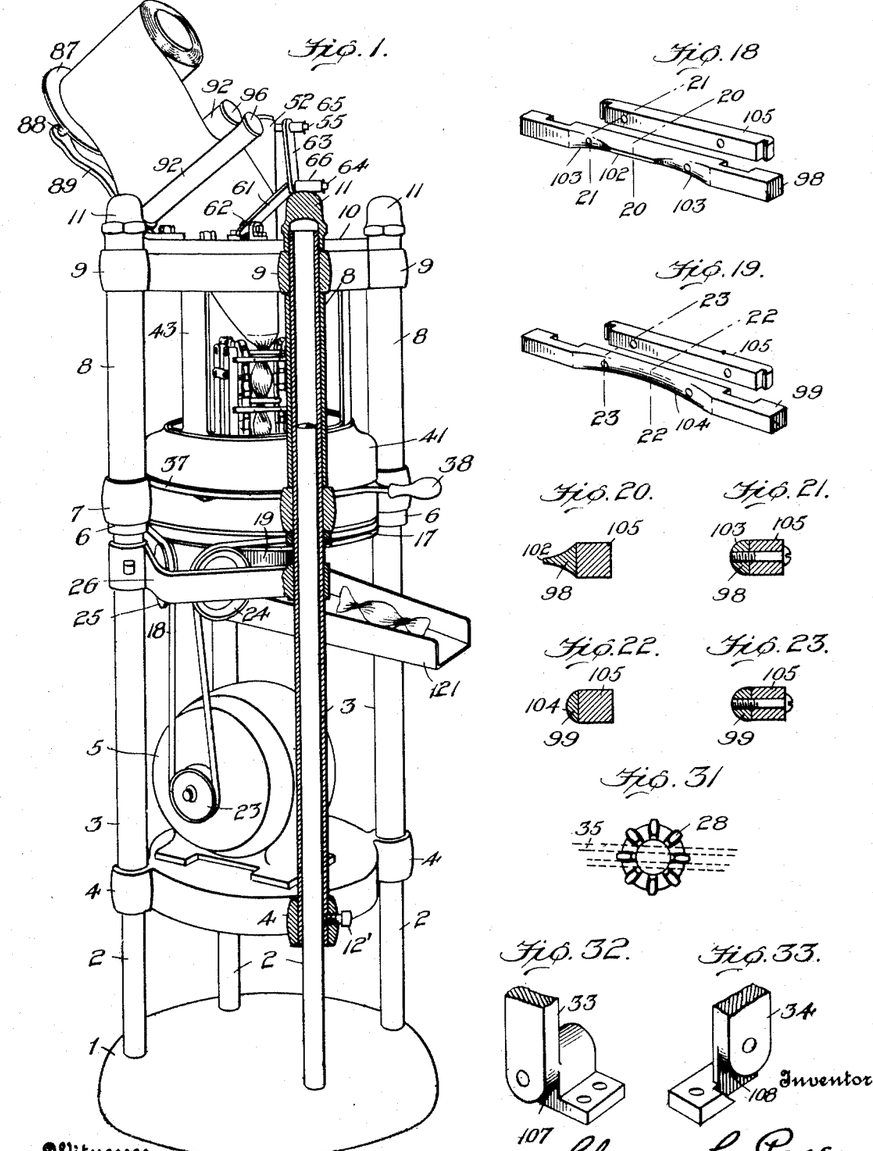
Figure 1 is a view in perspective of a wrapping machine embodying my invention, a portion of one of the standards of the adjustable frame being in vertical section.
Fig. 18 is a detail perspective view illustrating one of the wrapper engaging devices or twister bars of the wrapper twisting mechanism, together with the clamping bar by which it is secured to the chain belts of the twisting mechanism.
Fig. 19 is a view corresponding to Fig. 18, but illustrating another of the wrapper engaging devices of the twisting mechanism.
Fig. 20 is a detail section, taken on the plane of the line 20—20, Fig. 18.
Fig. 21 is a detail section, taken in the plane of the line 21—21, Fig. 18.
Fig. 22 is a detail section, in the plane of the line 22—22, Fig. 19.
Fig. 23 is a detail section in the plane of the line 23—23, Fig. 19.
Fig. 31 is a detail view looking toward the face of one of the worm-driven bevel gears of the apparatus, its relation to the worm being illustrated by dotted lines.
Figs. 32 and 33 are detail views of portions of the brackets for supporting the traveling wrapper twisting mechanism.

The bevel gears 27 and 28 which drive the wrapper twisting mechanism, one of which gears, 28, also drives the knife mechanism, are secured to horizontally extending parallel shafts 29 and 30, respectively, which extend secantwise across the circular bed 12 to which they are attached by means of pairs of brackets 31, 32, and 33, 34, in which they are respectively journaled. By thus arranging the shafts 29 and 30 the bevel gears 27 and 28 thereon may be driven by the annular worm member 35 as the bed plate 12 on which these gears and their shafts are mounted revolves, the teeth upon one side of each gear engaging the teeth or threads of the worm and those upon the other side of each gear clearing the worm. As illustrated in Fig. 31, the edges of the teeth of all the worm-driven bevel gears of the apparatus are preferably slightly rounded in order to prevent any possibility of the edges of the gear teeth scraping the teeth of the worm.

The annular worm member 35, which is preferably made of bronze, has upon its interior face right-handed threads having a cross-sectional form substantially like that of gear teeth, there being two teeth or threads per revolution. As the oppositely revolving bevel gears 27 and 28 driven by this worm have eight teeth each, it requires four revolutions of the bed 12 upon which these gears are mounted to cause a single revolution of the shafts 29 and 30 by which the actions of the wrapper twisting and knife mechanisms are controlled. This worm 35 may be and preferably is rigidly secured to the casting 7 by pins 36.

The starting and stopping of the mechanism may be controlled while the motor 5 is running by means of a manually operable controller 37. This controller 37 is preferably formed as a ring which encircles the worm member 35 and which, as more particularly shown in Figs. 2, 24, 25 and 26, is supported on and centered by the member 7. This ring, which is fashioned with a radially extending handle 38 by means of which it may be rotated in either direction, is provided on its under surface with oppositely disposed projections or knobs 39 which are adapted to rest either upon the upper horizontal edge of the member 7 or to enter depressed seats 40 therein. As will be seen upon reference to Fig. 26, the surfaces of the depressed seats 40 preferably slope upwardly in both directions, so that, assuming the projections 39 to be in the seats 40, the turning of the handle 38 in either direction will cause the projections 39 on the under side of the ring 37 to ride upwardly out of the depressed seats and to rest upon the upper edge of the member 7, thus elevating the ring and sustaining it in its elevated position. The elevation of the ring 37 brings its upper face in contact with the lower edge of the annular shield or guard 41, which is designed to prevent the dust and dirt from clogging the ball-race and lower worm 35, and thereby causes such shield to be raised slightly above the position which the parts occupy when the machine is performing its wrapping operations. As the dust guard 41 is rigidly connected by pins 42 to the barred cylinder 43 through the intermediary of which the feeding devices are actuated, and as this cylinder is itself rigidly connected by screws 44 to the base or bed 12 on which the wrapper twisting and knife mechanisms are mounted, the elevation of the dust guard 41 causes a corresponding lifting of the bed 12 and of the leather frictional facing 14 secured to the under side of the latter, thus breaking the frictional driving contact of the facing with the corresponding annular portion 15 of the pulley-driven member 16 and thereby stopping the operation of the wrapping mechanisms while the motor 5 continues to run.

Rigidly mounted on the upper end of the barred cylinder 43, which is journaled in the upper casting 9 of the frame so as to turn freely therein, is an annular worm 45 having teeth or threads of similar form to those of the lower worm 35. The worm 45 has four such left-handed threads or teeth per revolution, or double the number on the worm 35. It is by the rotation of this worm that the feeding devices which are carried by the cap-plate 10 are actuated. Meshing with this worm are two bevel gears 46 and 47 whose shafts are journaled in brackets 48 and 49, respectively, which may be conveniently secured to the under side of the cap-plate 10 in any suitable manner. As the worm 45 has four threads and the bevel gear 46 has eight teeth while the bevel gear 47 has sixteen, the barred cylinder 43 to which the worm 45 is secured makes two complete revolutions for each revolution of the bevel gear 46 and makes four revolutions to a single revolution of the larger bevel gear 47. The devices operated from the shafts of these two bevel gears are thus correspondingly timed.

Mounted centrally upon the cap-plate 10, as, for example, by means of a bracket 51 which is bolted to the cap plate, is a vertically extending cylindrical tube 52 that is provided with an aperture 53 through which the articles to be wrapped are introduced. Within the outer tube 52 is a slidable tube 54 which is capable of being vertically reciprocated by means of a laterally projecting pin 55 that extends through a vertical slot 56 with which the outer tube 52 is provided. This inner tube 54 is also provided, intermediate its length, with an opening 57 through which the articles to be wrapped may be introduced, the opening in the inner tube being sufficiently long to register with and leave the opening in the outer tube unobstructed when the inner tube is either in its upper or in its lower position.

The inner tube 54 is preferably reciprocated with respect to the outer tube 52 by means of the cam 58 which is rigidly secured to the shaft of the smaller bevel gear 46. This cam preferably coöperates with a cam roller 59 which is journaled upon the downwardly projecting portion 60 of a lever 61 which is pivotally mounted for vertical oscillation between the arms of a bracket 62 that is secured to the upper surface of the cap-plate 10. The vertical oscillations of the lever 61, which are due to the rotation of the cam 48, are communicated to the laterally projecting arm or pin 55 of the inner tube 54, and thus to the inner tube itself, by means of a link 63 which is pivotally connected to the pin 55 and to a similar pin 64 that is secured to the inner end of the cam actuated lever 61. For the sake of greater durability in the connections of the parts, as well as to insure precision of operation, the link 63 is preferably provided at its opposite ends with integrally attached cylindrical sleeves or bearings 65 and 66 in which the cylindrical pins 55 and 64 are, respectively, journaled. As a convenient means for causing the cam roller 59 to maintain its operative engagement with the face of the cam 58 a spring 67 may be interposed between the cap-plate 10 and the outer end of the lever 61 upon which the cam roller 51 is mounted. The reciprocating inner tube 54 serves to preserve the tubular form of the wrapping material between the twists therein, as will hereinafter appear.

Figure 11:
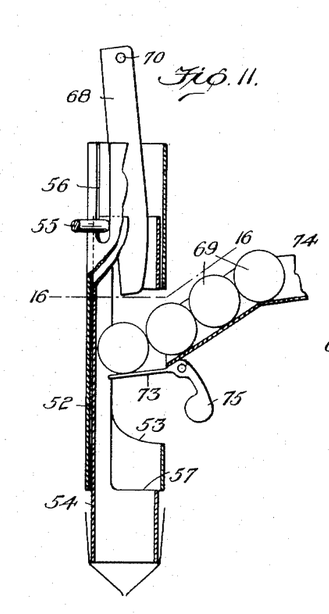
Figs. 11, 12 and 13 are detail views in vertical section of parts of the mechanism by which the articles to be wrapped are fed, one by one, to the wrapping material, the several views illustrating different positions assumed by the parts at various times during their operation.
Figure 12:
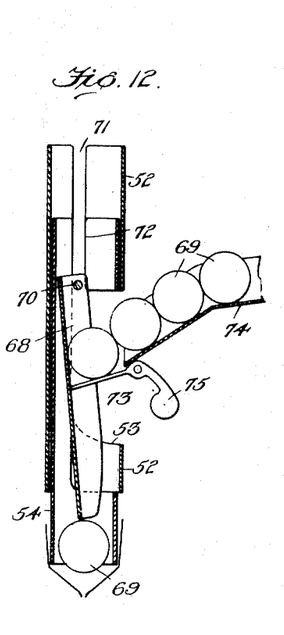
Figure 13:
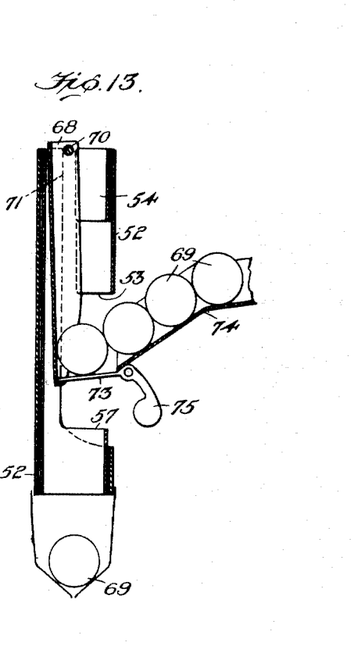
Figure 14:
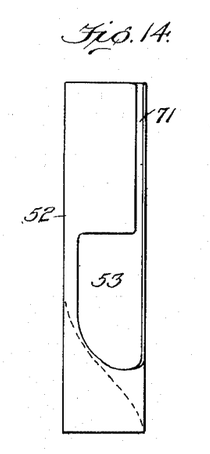
Fig. 14 is a detail elevation of the tubular member around which the strip of wrapping material passes spirally to form a tube and through which the articles to be wrapped are introduced, the position assumed by the upper edge of the strip of wrapping material in passing spirally around the tube being illustrated in dotted lines.
Figure 15:
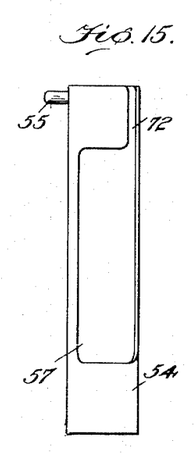
Fig. 15 is a detail elevation of an inner reciprocating tube which coöperates with the outer stationary tube shown in Fig. 14.
Figure 16:
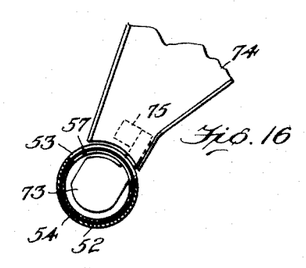
Fig. 16 is a detail view, taken in the plane of the line 16—16, Fig. 11.

Within the reciprocating inner tube 52 is an independently reciprocating plunger 68 by which the candy kisses 69 or other articles to be wrapped are fed to the tube of wrapping material. This plunger 68, which is preferably the segment of a cylindrical tube conforming to the adjacent face of the inner tube 54, is pivotally connected to and depends from an operating arm 70 which projects inwardly through vertically extending, registering slots 71 and 72 formed in the outer and inner tubes 52 and 54, respectively, the plunger 68 being so balanced that its lower end has a tendency or bias to swing toward the center of the inner tube. In feeding the articles to be wrapped, this plunger 68 coöperates with a swinging trap 73 which is pivotally attached to the inner end of a chute 74 that is mounted on the cap-plate 10 for the purpose of receiving the articles to be wrapped. The feed chute 74 is preferably inclined downwardly toward the tubes 52 and 54, as shown in Figs. 11, 12 and 13, and it is also preferably narrowed toward its delivery end, thus serving to cause the articles to be wrapped to be fed to the pivoted trap 73 one at a time.

Figure 17:
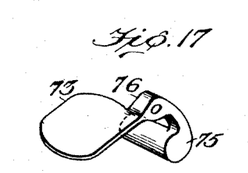
Fig. 17 is a detail perspective view of the retaining device or trap by which the articles to be wrapped are prevented from passing to the tube of wrapping material except at the proper time.

The pivoted trap 73 extends into the interior of the tubes 52 and 54 through the apertures 53 and 57, respectively, in the lateral walls thereof, and it is so counterbalanced by a counterbalancing weight 75 as to support any articles to be wrapped whose weight it may be required to bear. To limit the extent of the upward swinging of the trap 73 the latter may be conveniently provided with a slightly flattened face 76 (see Fig. 17) which, as shown in Figs. 11 and 13, is adapted to engage the lower face of the chute 74 at its inner end. As will be readily understood upon an inspection of Figs. 11, 12 and 13, when the feed plunger 68 moves downwardly its lower end engages the piece of candy 69 or other article to be wrapped that is on the trap 73 forcing the trap to swing downwardly and thus delivering the candy to the pocket formed in the wrapping material at the lower ends of the tubes 52 and 54. As the plunger thereafter moves upwardly the weighted trap forces it toward the wall of the inner tube 52 away from the end of the feed chute 74, thus allowing it to pass the trap 73 and assume a position above the trap and the article retained thereon, in readiness to repeat its feeding operation.

Figures 2, 5, 6, 7:
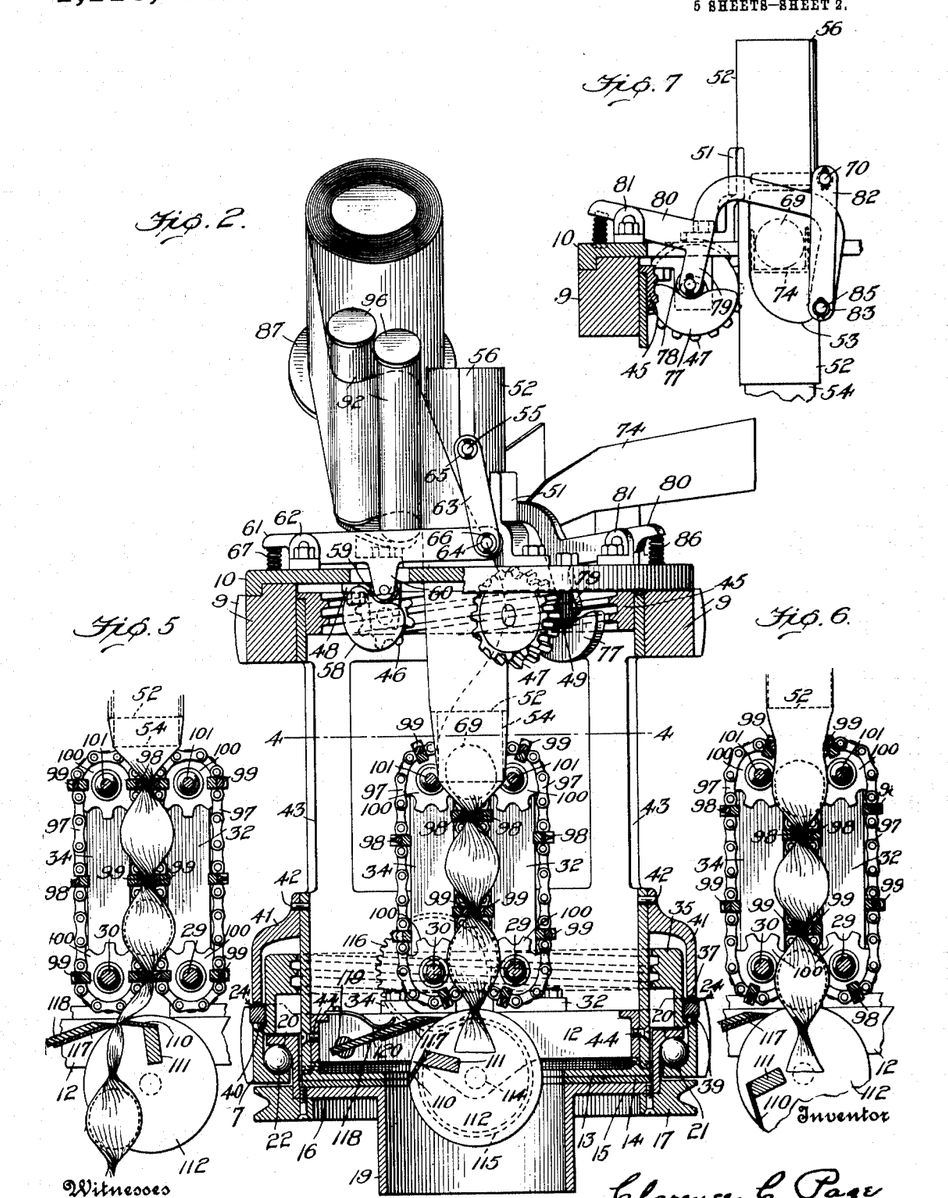
Fig. 2 is a detail view, partly in elevation and partly in vertical central section, showing the principal parts of the mechanism.
Fig. 5 is a detail vertical section illustrating the relative positions of the wrapper twisting and wrapper cutting mechanisms at the time of severing the wrapping material and just prior to the introduction of an article of merchandise to the tube formed in the wrapping material.
Fig. 6 is a view corresponding to Fig. 5, but illustrating the positions of the parts after the article to be wrapped has been fed to the wrapping material and as the final twist of the latter about the article is being initiated.
Fig. 7 is a detail vertical section, taken in the plane of the line 7—7, Fig. 3, showing a portion of the mechanism for feeding the article of merchandise to the wrapping material.

The reciprocating feed plunger 68 is preferably driven from a cam 77 that is rigidly secured to the shaft of the bevel gear 47. Engaging the operative face of this cam is a cam roller 78 which is journaled on the downwardly extending arm 79 of a lever 80 which is pivotally mounted on the cap-plate 10 by means of a bracket 81. The lever 80, which, as shown in Fig. 7, is arched so as to avoid contact with the feed chute 74, is pivotally connected at its outer end to a link 82 in the upper end of which is journaled the projecting arm or shaft 70 from which the reciprocating and swinging segmental plunger 68 depends. As a convenient means for connecting the link 82 to the lever 80 and to the operating arm 70 of the feed plunger, it is preferred to provide the link 82 with oppositely extending cylindrical bearing sleeves 83 and 84, the former serving to receive a pin 85 which projects laterally from the outer end of the link 82 and the latter serving to similarly receive the plunger operating arm or shaft 70. The cam roller 78 may be maintained in engagement with the operative face of the cam 77 by means of a spring 86 that is seated upon the cap-plate 10 and presses upwardly upon the inner end of the lever 80 by which the cam roller is borne.

Figures 24, 25, 26, 27, 28, 29, 30:
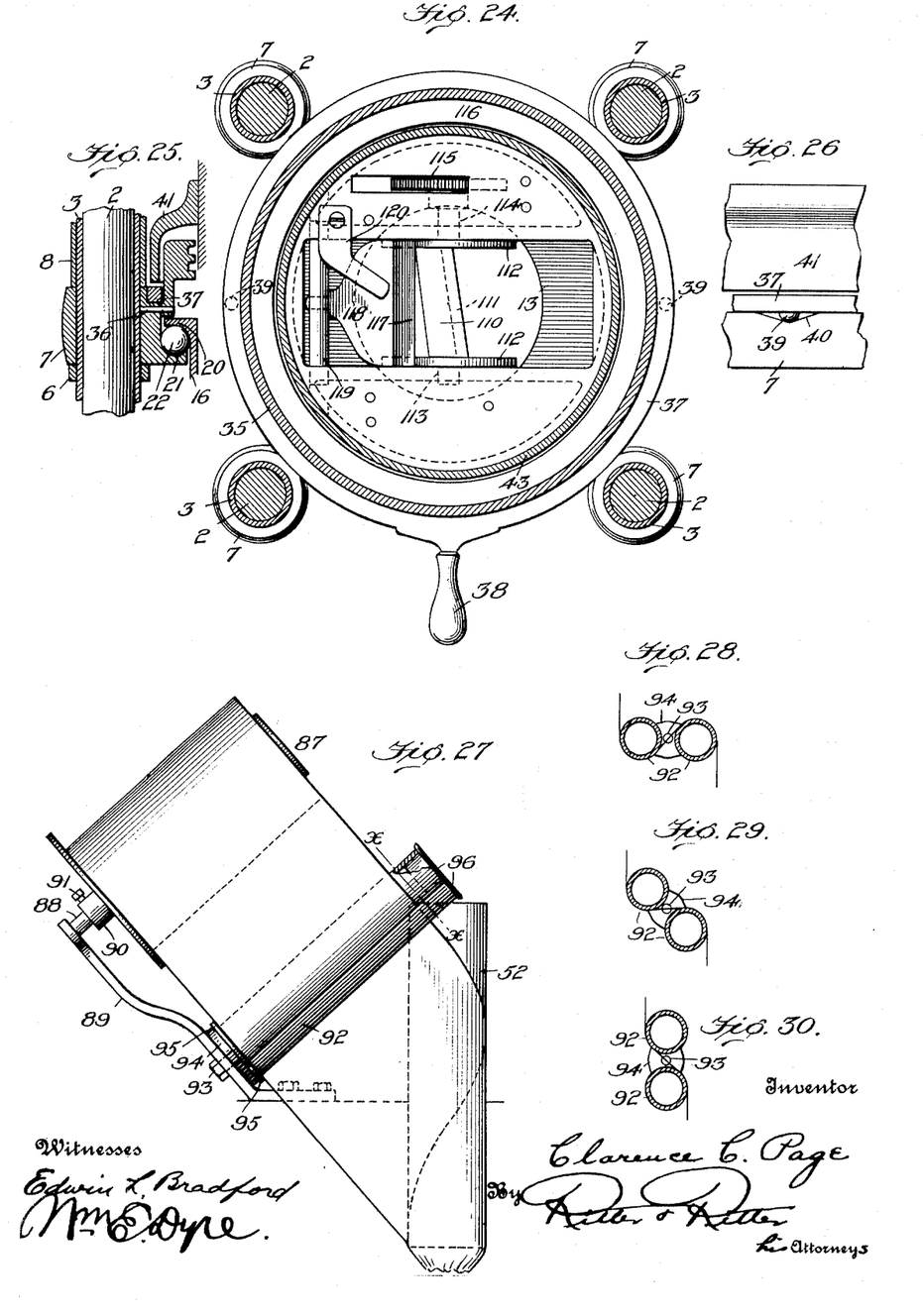
Fig. 24 is a horizontal section taken on the line 24—24, Fig. 2.
Fig. 25 is a detail view, in vertical section, showing the relation of the controlling ring, by which the wrapping mechanisms are stopped and started, to the machine frame and to the parts whose operation it controls.
Fig. 26 is a detail elevation illustrating a portion of the controlling ring and adjacent parts of the machine frame and rotating cylinder upon which the twisting mechanism is mounted.
Fig. 27 is a detail elevation of the supply reel and tensioning devices for the wrapping material, together with the feed tube around which the web of wrapping material is passed to form a tube.
Figs. 28, 29 and 30 are detail sections, on the line x—x, Fig. 27, illustrating several adjustments of the tensioning device for the web of wrapping material.

The wrapping material, which is preferably a strip or ribbon of paper, may be most conveniently supplied from a roll thereof which is carried upon a flanged reel 87. This reel is freely revoluble upon a shaft 88 that is secured to a bracket 89 which is rigidly attached at its lower end to the upper face of the cap-plate 10. An adjustable shaft-collar 90 with set-screw 91 serves to permit the adjustment of the reel 87 along the shaft 88, thus enabling the strip of wrapping material to be brought to and maintained in proper alinement. For the purpose of tensioning the web of wrapping material it is preferred to employ two parallel, slightly separated, stationary cylinders 92 which are connected to the reel-supporting bracket 89 by means of a cap-screw 93 which has threaded engagement with their base-plate 94 between the axes of the cylinders. As shown in Fig. 27, this paper tensioning device may be formed from pieces of cylindrical tubing having flanged plugs or closures 95 and 96 driven into their ends, the plugs 95 being secured to the base-plate 94 upon opposite sides of the cap-screw 93. As will be readily understood from an inspection of Figs. 28, 29 and 30, the cylinders of the tensioning device over and between which the web of wrapping material slides may be so positioned with respect to the web of material as to regulate the tension upon the latter to the desired amount. This adjustment of the tensioning device may be accomplished by simply loosening the cap-screw 93, turning the base-plate 94 until the cylinders 92 occupy the desired position and then again tightening the cap-screw.

Figure 4:
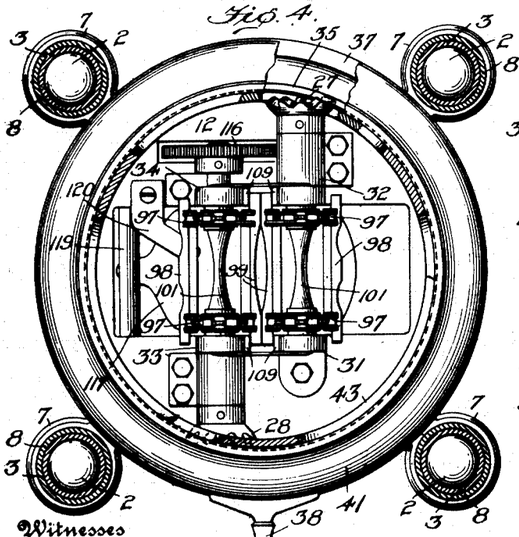
Fig. 4 is a horizontal section of the apparatus, taken in the plane of the line 4—4 Fig. 2.

The mechanism for twisting the wrapper, which also operates to pull the latter from the storage reel 87 as it may be needed, preferably consists of traveling, parallel link belts 97 that are arranged in pairs, the belts of each pair being connected by a series of transversely extending twister bars 98 and 99 which are adapted to engage the wrapping material and press it toward the center. Each link belt 97 passes around similar upper and lower sprocket wheels 100 which are arranged between the uprights or vertical standards of each pair of brackets 31 and 32, and 33 and 34, respectively, the upper sprocket wheels being idlers and the lower ones being the drivers of the chain belts. Each upper pair of sprocket wheels is mounted upon a shaft 101 which is journaled in the upper ends of the corresponding pair of brackets, 31 and 32 or 33 and 34, as the case may be; and each shaft 101, as more particularly shown in Fig. 4, is reduced in diameter intermediate its ends to permit the tube of wrapping material to pass therebetween with perfect freedom. One lower pair of the sprocket wheels 100 is rigidly mounted upon the shaft 29 which is driven by the bevel gear 27, while the sprocket wheels of the other lower pair are correspondingly mounted on the shaft 30 that is driven by the bevel gear 28, both shafts 29 and 30 being reduced in diameter intermediate of their length, similarly to the shafts 101, to afford ample clearance for the passage of the wrapped articles of merchandise. The sprocket wheels 100 are each preferably provided with eight teeth, as is the case with the bevel gears 27 and 28 for driving the shafts 29 and 30, respectively, and each chain belt 97 preferably contains twenty-four links; so that at each rotation of the shafts 29 and 30 the link belts 97 are caused to travel in unison a distance equal to the length of eight links, the adjacent vertically extending portions of the link belts toward the center of the mechanism moving downwardly and the outer segments of the belts moving upwardly.

The twister bars 98 and 99, respectively, which are mounted upon and extend transversely between the link belts of each pair at regular intervals (in the present instance at a distance of four links apart), are preferably of two forms, the bars of different forms being arranged alternately. As shown more especially in Fig. 9, the twister bars 98 are formed with a raised central portion 102 and depressed or lower portions 103 flanking the same, the result being that when two of the twister bars 98 come together in the operation of the machine the tube of paper or other wrapping material is grasped and crushed or flattened between the high parts 102 of the bars while the lower parts 103 permit the wrapping material on each side to be drawn toward the center without tearing as the twister bars continue to twist and pull downwardly upon the wrapping material, thus producing a close twist in the wrapper. The bars 98 serve to make the twist in the wrapper immediately in advance of the piece of candy or other article. The bars 99 operate upon the wrapper in forming the twist therein immediately behind the article that is being wrapped. As shown in Fig. 10, these bars 99 are preferably depressed or of concave form along their outer faces, as at 104, so as to avoid gripping the wrapping material too tightly to prevent it from slipping between them, but being sufficiently high to crush or crumple the tube of wrapping material, force it inwardly and compel it to twist behind the piece of candy As the pulling and twisting of the wrapping material by the bars 98 continue, the wrapper is drawn tightly around the article being wrapped and is twisted behind it, the concaving of the faces 104 of the bars 99 permitting the wrapping material to slip through them and be drawn tightly around the pieces of candy or other articles even though the latter may vary in size and form.

The twister bars 98 and 99, which are preferably notched to receive their respective chains 97, may be conveniently secured to the latter by means of clamping bars 105 which catch over the inside links only of the chains and which are secured to their corresponding twister bars by means of screws 106. To permit the laterally projecting ends of the twister bars to clear the brackets 31, 32, 33 and 34 in passing around the lower sprocket wheels 100, the brackets may be appropriately channeled or undercut as indicated at 107 and 108 in Figs. 32 and 33 of the drawings.

Figures 3, 8:
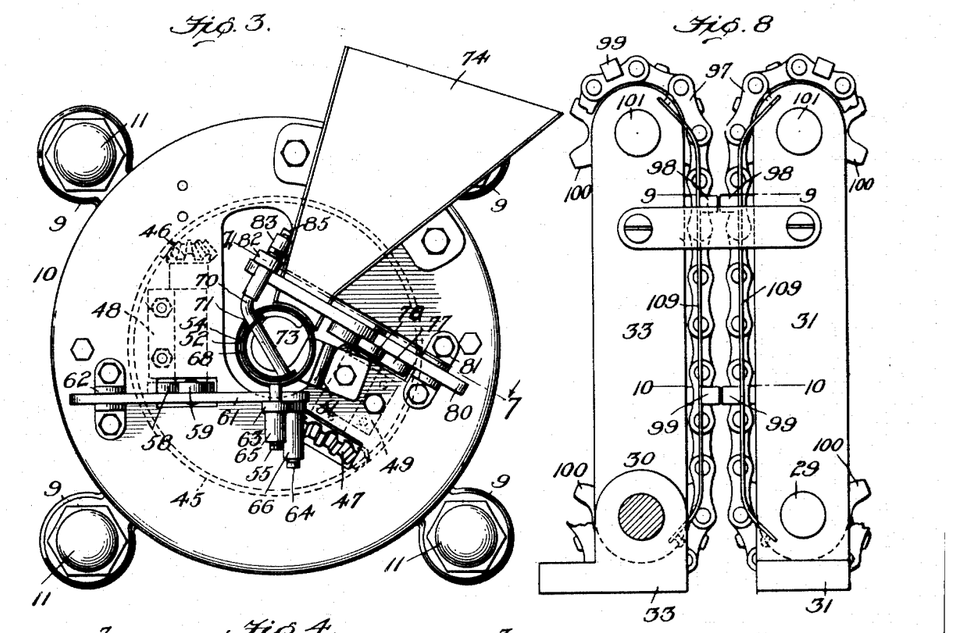
Fig. 3 is a plan view of the wrapping machine, the supporting and tensioning devices for the roll of wrapping material being removed.
Fig. 8 is a detail elevation of the wrapper twisting mechanism.
Figure 9:
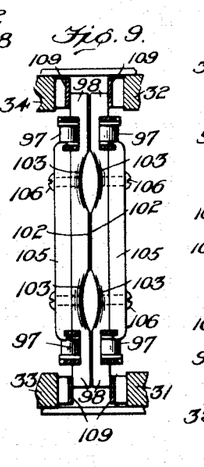
Fig. 9 is a horizontal section, taken in the plane of the line 9—9, Fig. 8.
Figure 10:
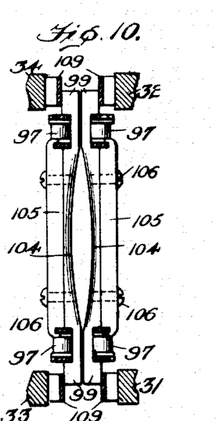
Fig. 10 is a horizontal section, taken in the plane of the line 10—10, Fig. 8.

As shown more especially in Figs. 8, 9 and 10, the inner faces of the upright portions of the brackets 31, 32, 33 and 34 are preferably provided with yielding facings or strips of spring steel 109 whose upper and lower ends may be secured in kerfs in their respective brackets. These spring facings, which are bent or curved outwardly at their ends to facilitate the entry and departure of the traveling twister bars 98 and 99, are adapted to engage the laterally projecting ends of the twister bars and adjustably maintain the latter in operative engagement with the wrapping material which is gripped between them.

The mechanism for severing the wrapping material, to thus free the wrapped articles from each other, preferably consists of a rotary knife which coöperates with a substantially stationary knife, the cutting edges of the two knives being arranged at an angle to each other so as to shear the wrapping material. The rotary knife, which preferably consists of a cutting portion 110 of high speed steel that is mounted upon a reinforcing member 111 of mild steel, extends between and is secured to two disks 112 which are supportingly journaled in bearings formed on the under side of the rotating bed 12 by which the wrapper twisting mechanism is carried. One of the disks 112 has a short shaft 113 which serves as a journal only, while the shaft 114 to which the other disk is rigidly secured is provided at its outer end with a pinion 115 by means of which the shaft 114, the disks 112 and the knife secured between the disks are caused to rotate. The pinion 115 meshes with a pinion 116 of the same size that is rigidly secured to the shaft 30 by which the sprocket wheels that drive one pair of the link belts 97 are driven. The rotary knife, therefore, makes one complete rotation at each rotation of the shafts 29 and 30 by which the wrapper twisting devices are actuated.

The knife 117 with which the rotary knife coöperates, while substantially stationary, is preferably so mounted on the rotating bed 12 as to be capable of yielding so as to accommodate itself to the cutting edge of the member 110 of the rotary knife as the two cutting edges shear upon each other. To this end the mild steel reinforcing member 118 on which the knife 117 is mounted is preferably secured at its inner end to a shaft 119 which is journaled in the depending webs of the rotating bed 12, while a spring 120, which is secured to the bed 12, bears upon the upper side of the reinforcing member 118 and thus forces the latter and its attached knife 117 of high speed steel toward the rotary knife. By this arrangement the knife 117 is caused to bear upon and be supported by the edges of the disks 112 and to shear across the cutting edge of the member 110 of the rotary knife to sever the wrapping material, the cutting edge of the rotary knife projecting radially outwardly beyond the peripheries of the disks 112 except for a short distance at its leading end, which is sufficiently depressed below the edge of the adjacent disk to insure the stationary knife 117 shearing across the cutting edge of the rotary knife without catching. The form of knife mechanism described is preferred for severing the wrapping material as it is efficient at all speeds and is quiet in operation, the rotary knife running continuously in one direction.

In the operation of the machine the web of wrapping material, which by passing spirally around the tube 52 is formed into a tube at the lower end of the latter, is grasped below the tube 52 between a pair of opposed twister bars 98. As these bars travel downwardly, rotating as they go, the wrapper is twisted between them, the length of the twist being limited by the reciprocating inner tube 54 which follows the twister bars 98 downwardly and thus causes the wrapper twist to be confined to the space between its lower end and the pair of twister bars immediately below. When, as shown in Fig. 2, the tubular pocket in the wrapping material above the twister bars is of sufficient size to receive an article that is to be wrapped, the segmental feed plunger 68 moves downwardly and delivers one of the articles from the feed chute 74 to the inside of the tubular pocket of wrapping material, as heretofore described. The inner tube 54 then moves upwardly until, as shown in Figs. 6 and 13, it is retracted within the tube 52 around which the wrapper web is formed. The inner tube remains in this upper position while the succeeding pair of twister bars 99 are closing upon the tube of wrapping material, after which it follows the bars 99 downwardly in precisely the same manner as has already been described with respect to the twister bars 98. The tubular pocket thus formed in the wrapping material above the twist made by the pair of twister bars 99 is permitted to remain empty, the feed plunger 68, which operates but once while the inner tube 54 operates twice, remaining stationary while the inner tube is retracted and the succeeding pair of twister bars 98 grip the wrapper. After the twister bars 98 grip the wrapper the inner tube 54 again follows them downwardly, the feed plunger 68 again acts to supply another article to the tubular pocket in the wrapper above the twist formed by the bars 98, the inner tube 54 again moves upwardly and the twister bars 99 of the next pair move inwardly to form the twist in the wrapper behind the article of merchandise. These operations are repeated, the pockets in the wrapping material between the twists being alternately filled and empty. As the wrapped articles thus connected pass downwardly the knife mechanism, as shown in Figs. 2, 5 and 6, severs the wrapping material through the empty pockets, thus freeing the wrapped articles from each other and permitting them to pass downwardly through the delivery tube 19 and out of the machine through the delivery chute 121.

I claim:

1. In a wrapping machine, the combination with means for supplying the wrapping material and means for feeding an article of merchandise which is to be wrapped, of means for continuously twisting the wrapping material to retain it in enveloping relation with the article of merchandise, said wrapper twisting means including relatively movable members which are continuously rotatable on a common axis.

2. In a wrapping machine, the combination with means for supplying the wrapping material and means for feeding an article of merchandise which is to be wrapped, of means for continuously twisting the wrapping material to retain it in enveloping relation with the article of merchandise, and means for severing the wrapping material between two twists therein after the twists are formed.

3. In a wrapping machine, the combination with means for supplying a web of wrapping material, of means for causing the wrapping material to extend spirally and thereby assume a tubular form, means for inserting an article of merchandise which is to be wrapped into the tubular portion of the web of wrapping material, and means for continuously twisting the wrapping material to retain it in enveloping relation with the article of merchandise.

4. In a wrapping machine, the combination with means for supplying a web of wrapping material, of means for causing the wrapping material to assume a tubular form, means for successively inserting articles of merchandise which are to be wrapped into the tubular portion of the web of wrapping material, means for continuously twisting the wrapping material in the same direction to retain it in enveloping relation with the articles of merchandise, and means for severing the wrapping material between two twists therein after the twists are formed.

5. In a wrapping machine, the combination with means for supplying a web of wrapping material, of means for directing said web spirally so as to form it into a tube, means for feeding the articles of merchandise to be wrapped, means for causing the wrapping material to envelop the articles of merchandise, and means for severing the web of wrapping material to free the wrapped articles from each other after the wrapper enveloping operation.

6. In a wrapping machine, the combination with means for supplying the wrapping material and means for feeding the articles of merchandise which are to be wrapped, of means for twisting the wrapping material to retain it in enveloping relation with the articles of merchandise, and means for severing the wrapping material after the twists have been formed therein, said wrapper twisting means and said means for severing the wrapping material being rotatable about a common axis.

7. In a wrapping machine, the combination with means for supplying the wrapping material and means for feeding the articles of merchandise which are to be wrapped, of means for twisting the wrapping material to retain it in enveloping relation with the articles of merchandise, and means for severing the wrapping material between two twists therein, said wrapper twisting means and said means for severing the wrapper being rotatable about a common axis and each including relatively movable members, the members of said wrapper twisting means being adapted to move in a direction parallel to said axis of rotation.

8. In a wrapping machine, the combination with means for feeding the articles to be wrapped, of means for supplying a web of wrapping material, a tubular member through which the articles to be wrapped are fed and around which the web of wrapping material passes spirally, and means for twisting the wrapping material to retain it in enveloping relation with the articles of merchandise.

9. In a wrapping machine, the combination with means for feeding the articles to be wrapped, of means for supplying a web of wrapping material, a tubular member through which the articles to be wrapped are fed and around which the web of wrapping material passes spirally, means for twisting the wrapping material to retain it in enveloping relation with the articles of merchandise, and means for severing the wrapping material between two twists therein after the twists are formed.

10. In a wrapping machine, the combination with means for feeding the articles to be wrapped, of means for supplying a web of wrapping material, an outer tubular member through which the articles to be wrapped are fed and around which the web of wrapping material passes spirally an inner tubular member adapted to reciprocate within said outer tubular member and to support the wrapping material beyond the end of such outer tubular member, and means for twisting the wrapping material after it leaves the outer tubular member to thereby retain it in enveloping relation with the articles of merchandise.

11. In a wrapping machine, the combination with means for supplying a web of wrapping material, of means for feeding the articles of merchandise which are to be wrapped, and means for continuously twisting the wrapping material in the same direction to retain it in enveloping relation with the articles of merchandise, said wrapper twisting means also serving to cause the feed of the wrapping material.

12. In a wrapping machine, the combination with means for supplying the wrapping material, of means for feeding the articles of merchandise which are to be wrapped, and means for enveloping the articles of merchandise in the wrapping material, said means for feeding the articles of merchandise including a tube around the exterior of which the wrapping material passes spirally and a plunger adapted to reciprocate within said tube.

13. In a wrapping machine, the combination with means for supplying the wrapping material, of means for feeding the articles of merchandise which are to be wrapped, and means for enveloping the articles of merchandise in the wrapping material, said means for feeding the articles of merchandise including a tube around which the wrapping material is formed, a plunger adapted to reciprocate within said tube, and a movable trap which extends into said tube and which is adapted to support an article of merchandise to be wrapped.

14. In a wrapping machine, the combination with means for supplying the wrapping material, of means for feeding the articles of merchandise which are to be wrapped, and means for enveloping the articles of merchandise in the wrapping material, said means for feeding the articles of merchandise including a tube around which the wrapping material passes spirally and a pivoted plunger adapted to reciprocate within said tube.

15. In a wrapping machine, the combination with means for supplying the wrapping material, of means for feeding the articles of merchandise which are to be wrapped, and means for enveloping the articles of merchandise in the wrapping material, said means for feeding the articles of merchandise including a tube, a pivoted segmental cylindrical plunger adapted to reciprocate within said tube and pivoted trap which extends into said tube and which is adapted to support an article of merchandise that is to be wrapped.

16. In a wrapping machine, the combination with means for supplying the wrapping material, of means for feeding the articles of merchandise which are to be wrapped, and means for enveloping the articles of merchandise in the wrapping material, said means for feeding the articles of merchandise including a tube around which the wrapping material spirally passes, said tube having a lateral aperture permitting entry of the articles to be wrapped.

17. In a wrapping machine, the combination with means for supplying the wrapping material, of means for feeding the articles of merchandise which are to be wrapped, and means for twisting the wrapping material to retain it in enveloping relation with the articles of merchandise, said wrapper twisting means including traveling belts provided with members which are adapted to engage the wrapping material.

18. In a wrapping machine, the combination with means for supplying the wrapping material, of means for feeding the articles of merchandise which are to be wrapped, and means for twisting the wrapping material to retain it in enveloping relation with the articles of merchandise, said wrapper twisting means including a plurality of traveling belts which simultaneously rotate bodily about a common axis.

19. In a wrapping machine, the combination with means for supplying the wrapping material, of means for feeding the articles of merchandise which are to be wrapped, and means for twisting the wrapping material to retain it in enveloping relation with the articles of merchandise, said wrapper twisting means including a plurality of traveling and bodily rotating belts provided with bars which are adapted to engage the wrapping material.

20. In a wrapping machine, the combination with means for supplying the wrapping material, of means for feeding the articles which are to be wrapped, and means for twisting the wrapping material to retain it in enveloping relation with the articles of merchandise, said wrapper twisting means including a plurality of bars which are adapted to receive the wrapping material between them and means for causing said bars to simultaneously rotate and travel bodily in the direction of their axes of rotation.

21. In a wrapping machine, the combination with means for supplying the wrapping material, of means for feeding the articles of merchandise to be wrapped, and means for twisting the wrapping material to retain it in enveloping relation with the articles of merchandise, said wrapper twisting means including a plurality of traveling belts arranged in pairs and bars mounted upon and extending between the belts of each pair, the adjacent segments of the belts of each pair being adapted to travel in the same direction in unison and the corresponding bars of each pair of belts being adapted to engagingly receive the wrapping material between them.

22. In a wrapping machine, the combination with means for supplying the wrapping material, of means for feeding the articles of merchandise which are to be wrapped, and means for twisting the wrapping material to retain it in enveloping relation with the articles of merchandise, said wrapper twisting means including a plurality of link belts which are arranged in pairs and which travel at equal speeds and rotate bodily about a common axis, and bars mounted upon and extending between the belts of each pair, some of said bars having a centrally located projecting portion and some of said bars having a centrally located depression, the two forms of bars on each pair of belts being alternated.

23. In a wrapping machine, the combination with means for supplying the wrapping material, of means for feeding the articles of merchandise which are to be wrapped, means for twisting the wrapping material to retain it in enveloping relation with the articles of merchandise, and means for actuating the wrapper twisting means, said wrapper twisting means including a plurality of relatively movable members, and said means for actuating the wrapper twisting means including a plurality of continuously rotating parallel shafts which are respectively driven by bevel gears that engage an annular worm member.

24. In a wrapping machine, the combination with means for supplying the wrapping material, of means for feeding the articles of merchandise which are to be wrapped, means involving relatively movable members for twisting the wrapping material to retain it in enveloping relation with the articles of merchandise, means for causing said wrapper twisting means to rotate as a whole, and means for causing said relatively movable members to move in the direction of length of the axis about which the wrapper twisting means rotates, said means for causing the rotation of said wrapper twisting means including frictional driving means.

25. In a wrapping machine, a rotatable bed, wrapper twisting mechanism mounted on said bed, wrapper severing mechanism mounted on said bed, means for feeding the articles of merchandise which are to be wrapped, means operated by the rotation of said bed for actuating said feeding means, means frictionally engaging said bed for causing the latter to rotate, and a movable ring provided with a handle for controlling the frictional driving engagement of the bed and its driving means.

26. In a wrapping machine, the combination with means for supplying the wrapping material, of means for feeding the articles of merchandise which are to be wrapped, means for continuously twisting the wrapping material to retain it in enveloping relation with the articles of merchandise, and means for severing the wrapping material, said wrapper twisting means including a plurality of rotatable and bodily movable bars which are adapted to engage the wrapping material, and means for yieldingly maintaining corresponding bars in engagement with the wrapping material.

27. In a wrapping machine, the combination with means for supplying the wrapping material and means for feeding the articles of merchandise which are to be wrapped, of wrapper twisting mechanism and wrapper severing mechanism which are rotatable about a common axis, said wrapper severing mechanism involving coöperating knives one of which is independently rotatable and continuously movable with respect to the other.

28. In a wrapping machine, the combination with means for supplying the wrapping material, of means for feeding the articles of merchandise which are to be wrapped, means for twisting the wrapper to retain it in enveloping relation with the articles of merchandise, and means for severing the wrapping material, said wrapper severing means involving knives which are rotatable about a common axis and one of which is continuously rotatable independent of the other.

29. In a wrapping machine, the combination with means for supplying the wrapping material and means for feeding the articles of merchandise which are to be wrapped, of wrapper twisting mechanism and wrapper severing mechanism which are rotatable about a common axis, said wrapper severing mechanism involving an independently rotatable knife, revolving disks between which said knife is mounted, and a coöperating knife adapted to be supported in operative position by said disks.

30. In a wrapping machine, the combination with means for supplying the wrapping material, of means for feeding the articles of merchandise which are to be wrapped, means for twisting the wrapper to retain it in enveloping relation with the articles of merchandise, means for severing the wrapping material, said wrapper twisting means and wrapper severing means being rotatable about a common axis, and a delivery tube through which the wrapped articles of merchandise pass, the axis about which the wrapper twisting means and wrapper severing means rotate passing through said tube.

31. In a wrapping machine, the combination with the machine frame, of a rotatable bed mounted thereon, means for supplying the wrapping material and means for feeding the articles of merchandise which are to be wrapped, both of said means being mounted upon the frame, and means for continuously twisting the wrapper and means for severing the wrapper, both of said last named means being mounted upon the rotatable bed.

32. In a wrapping machine, the combination with means for supplying the wrapping material, means for feeding the articles of merchandise which are to be wrapped, means for twisting the wrapping material to retain it in enveloping relation with the articles of merchandise, means for severing the wrapping material, means including a rotatable worm member for actuating the article feeding means, and means including a stationary worm member for actuating the wrapper twisting means.

In testimony whereof I affix my signature, in the presence of two subscribing witnesses.

CLARENCE C. PAGE.

Witnesses:
F. H. MEYER,
L. M. GILLIAM.